(12) United States Patent
Dinariev et al.

(10) Patent No.: US 12,134,960 B2
(45) Date of Patent: Nov. 5, 2024

(54) METHOD AND SYSTEM OF EVALUATING HYDROCARBON IN HETEROGENEOUS FORMATION

(71) Applicant: Schlumberger Technology Corporation, Sugar Land, TX (US)

(72) Inventors: Oleg Yurievich Dinariev, Moscow (RU); Nikolay Vyacheslavovich Evseev, Moscow (RU); Sergey Sergeevich Safonov, Moscow (RU); Denis Vladimirovich Klemin, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 763 days.

(21) Appl. No.: 17/413,268

(22) PCT Filed: Dec. 11, 2018

(86) PCT No.: PCT/RU2018/000808
§ 371 (c)(1),
(2) Date: Jun. 11, 2021

(87) PCT Pub. No.: WO2020/122746
PCT Pub. Date: Jun. 18, 2020

(65) Prior Publication Data
US 2022/0056792 A1 Feb. 24, 2022

(51) Int. Cl.
*E21B 43/16* (2006.01)
*G01V 20/00* (2024.01)

(52) U.S. Cl.
CPC .............. *E21B 43/16* (2013.01); *G01V 20/00* (2024.01); *E21B 2200/20* (2020.05); *G01V 2210/646* (2013.01); *G01V 2210/663* (2013.01)

(58) Field of Classification Search
CPC ........... G06F 30/27; G06N 3/04; G06N 3/082
USPC .......................................................... 703/10
See application file for complete search history.

(56) References Cited

U.S. PATENT DOCUMENTS 9,043,188 B2 * 5/2015 Yeten ...................... E21B 43/00
703/10
9,790,770 B2 * 10/2017 King ....................... E21B 43/00
10,942,098 B2 * 3/2021 Ammar .................... G01N 1/34
(Continued)

FOREIGN PATENT DOCUMENTS

CN 104471614 A 3/2015
CN 104616353 A 5/2015
(Continued)

OTHER PUBLICATIONS

Dinariev et al. (Multiphase flow modeling with density functional method, Computer Geoscience, 2016, pp. 835-856) (Year: 2016).*
(Continued)

*Primary Examiner* — Iftekhar A Khan
(74) *Attorney, Agent, or Firm* — Jeffrey D. Frantz

(57) ABSTRACT

Methods and systems for evaluating hydrocarbon in heterogeneous formations are disclosed. The use of three-dimensional simulation of the heterogeneous and porous structure at the nanometer scale of formation facilitates more accurate evaluation of the hydrocarbon reserve and fluid behavior.

19 Claims, 11 Drawing Sheets

1 μm

(56) References Cited

U.S. PATENT DOCUMENTS

| | | | |
|---|---|---|---|
| 2008/0162098 A1* | 7/2008 | Suarez-Rivera | G01V 11/00 703/10 |
| 2009/0319243 A1* | 12/2009 | Suarez-Rivera | G01V 1/50 702/11 |
| 2010/0004972 A1 | 1/2010 | Harel et al. | |
| 2010/0300681 A1* | 12/2010 | Dai | E21B 43/003 166/249 |
| 2014/0156557 A1* | 6/2014 | Zeng | G06Q 10/0631 705/348 |
| 2015/0212233 A1* | 7/2015 | Diaz Campos | G01V 20/00 703/2 |
| 2015/0235376 A1* | 8/2015 | Derzhi | G06T 15/08 382/109 |
| 2016/0063150 A1* | 3/2016 | Safonov | E21B 43/16 703/10 |
| 2016/0178785 A1* | 6/2016 | Wilson | G01V 3/265 324/324 |
| 2016/0194940 A1* | 7/2016 | Andersen | G06F 17/18 703/2 |
| 2016/0259156 A1* | 9/2016 | Bifano | G02B 27/0068 |
| 2016/0305237 A1* | 10/2016 | Klemin | E21B 49/00 |
| 2016/0306074 A1* | 10/2016 | Andersen | G01V 99/00 |
| 2016/0319640 A1* | 11/2016 | Ratulowski | G06F 30/20 |
| 2016/0348480 A1* | 12/2016 | Zuo | E21B 47/10 |
| 2016/0369601 A1* | 12/2016 | Safonov | G06F 30/28 |
| 2018/0156932 A1* | 6/2018 | Sain | G01V 1/282 |
| 2018/0223633 A1* | 8/2018 | Dinariev | E21B 41/00 |
| 2018/0321416 A1* | 11/2018 | Freedman | G01V 3/32 |
| 2018/0371883 A1* | 12/2018 | Enkababian | G01V 5/12 |
| 2019/0227087 A1* | 7/2019 | Belani | G01N 33/24 |
| 2021/0080371 A1* | 3/2021 | Johns | G01V 20/00 |

FOREIGN PATENT DOCUMENTS

| | | | | |
|---|---|---|---|---|
| EP | 2090907 A1 | 8/2009 | | |
| WO | 2017028161 A1 | 2/2017 | | |
| WO | WO2017079178 A1 * | 5/2017 | ............ | G01N 24/08 |
| WO | 2020047451 A1 | 3/2020 | | |

OTHER PUBLICATIONS

Kou et al. (Thermodynamically consistent modeling and simulation of multi-component two-phase flow with partial miscibility, Comput. Methods Appl. Mech. Engrg. 331 (2018) 623-649) (Year: 2018).*
S.M. Walas. Phase Equilibria in Chemical Engineering. Butterworth Publ., 1985, pp. 54-58.
Bhushan, B. (Ed.): Springer Handbook on Nanotechnology. Springer-Verlag, Berlin (2004) pp. 543-604.
Lake, L.W., Enhanced Oil Recovery, Prentice Hall, 1989 pp. 1-187.
Office action received in the RU application 2021120293, dated Dec. 22, 2021 (21 pages).
A. Demianov, O. Dinariev and N. Evseev, Density functional modelling in multiphase compositional hydrodynamics, Can. J. Chem. Eng., 89, pp. 206-226, 2011.
A. Demianov, O. Dinariev and N. Evseev. Introduction to the Density Functional Method in Hydrodynamics. FIZMATLIT, 2014 (7 pages).
D. Tiab, E.D. Donaldson. Petrophysics. Theory and Practice of Measuring Reservoir Rock and Fluid Transport Properties. Elsevier, 2004, pp. 147-152.
E.J. Peters. Petrophysics, https://www.scribd.com/document/46981764/ Peters-E-J-Petrophysics, University of Texas, 2007, p. 3-107.
E.J.Peters, Petrophysics, https://www.scribd.com/document/46981764/ Peters-E-J-Petrophysics, University of Texas, 2007, pp. 5-23,5-24.
Othman, M. B., Jalan, S., Masoudi, R., Mohd Shaharudin, M. S. B. (Jul. 2, 2013). Chemical EOR: Challenges for Full Field Simulation. Society of Petroleum Engineers. doi: 10.2118/165247-MS (11 pages).
International Search Report and Written Opinion issued in the PCT Application PCT/US2019/049126, dated Nov. 28, 2019 (8 pages).
International Preliminary Report on Patentability issued in the PCT Application PCT/US2019/049126, dated Mar. 2, 2021 (5 pages).
International Search Report and Written Opinion issued in the PCT Application PCT/RU2018/000808, dated Aug. 29, 2019 (9 pages).
International Preliminary Report on Patentability issued in the PCT Application PCT/RU2018/000808, dated Jun. 24, 2021 (7 pages).
First Office Action issued in Chinese Patent Application No. 201880100643.X dated Dec. 26, 2023, 15 pages with English translation.

* cited by examiner

1μm

METHOD AND SYSTEM OF EVALUATING HYDROCARBON IN HETEROGENEOUS FORMATION

CROSS-REFERENCE TO RELATED APPLICATION

This application is a National Stage Entry of International Patent Application No. PCT/RU2018/000808, filed on Dec. 11, 2018.

FIELD OF THE DISCLOSURE

The disclosure generally relates to methods and systems for quantitative evaluation and optimization of enhanced oil recovery (EOR) and improved oil recovery (IOR) development schemes in case of tight heterogeneous formation which combines digital rock approach with density functional modeling of processes at pore scale.

BACKGROUND OF THE DISCLOSURE

One important part in hydrocarbon field development planning is evaluation and optimization of different enhanced or improved oil recovery schemes. At present this problem is solved by two complementary methods: (a) using detailed geological and hydrodynamic reservoir 3D modeling with application of commercial simulators to obtain quantitative description of reservoir processes, and (b) with physical core flood tests in a laboratory environment. Once a sufficient number of various development scenarios is obtained by ideally a combination of simulations and physical tests an ideal case is identified as the optimal development solution.

SUMMARY OF THE DISCLOSURE

The present disclosure includes any of the following embodiments in any combination(s) of one or more thereof:

According to an aspect of the present disclosure, one or more embodiments relate to a method for the evaluation of fluids in a tight hydrocarbon reservoir within a heterogeneous geological formation or a portion thereof, the method comprising the steps of: obtaining physical parameters of the fluids and the formation; constructing at least one three-dimensional (3D) model of the tight hydrocarbon reservoir using the physical parameters, wherein the three-dimensional model comprise simulations of pore structure and mineralogical content; calculating a hydrocarbon amount for each said three-dimensional model; calculating overall amount of hydrocarbon reserves; and creating a development plan based on the calculated overall hydrocarbon reserves.

Another embodiment provides a method for the evaluation and the optimization of enhanced oil recovery or improved oil recovery techniques for tight hydrocarbon reservoirs, comprising the steps of: constructing at least one three-dimensional rock model of porous rock using physical properties and three-dimensional porous solid images of representative core samples from the tight hydrocarbon reservoir, wherein the set of three-dimensional rock models is determined by the set of representative core samples with every three-dimensional rock model comprising the pore distribution and mineralogical content; constructing the overall fluid component in the three-dimensional rock model; calculating a three-dimensional distribution of fluid components in the three-dimensional rock model. Then the considered hydrocarbon reservoir volume is populated by 3D rock models, which are determined by the set of representative core samples. This gives calculation of the exchange rate of fluid components between the three-dimensional rock models and dynamics of overall amount of the fluid components in the tight hydrocarbon reservoir. The next stage is producing of a reservoir development plan based on the calculated dynamics of flow.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
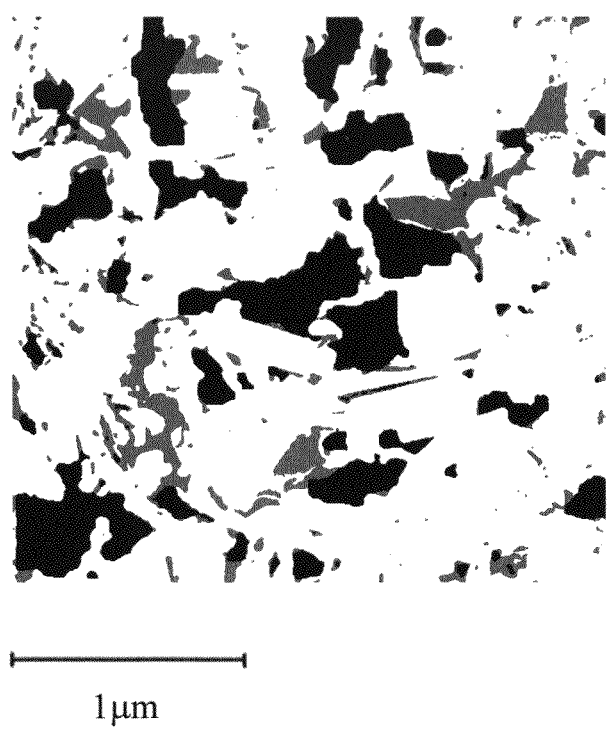
FIG. 1 shows spatial distribution of rock grains, pores and solid organics in two-dimensional image obtained by FIB-SEM (Focused Ion Beam-Scanning Electron Microscopy). Here rock grains are shown in white, pores are shown in black, and solid organics (with solid hydrocarbon) is shown in grey.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

As used herein, the term "tight hydrocarbon reservoir" is a reservoir containing hydrocarbons (such as oil and/or natural gas) that is formed of relatively impermeable reservoir rock from which hydrocarbon production is difficult. The relative impermeability of the reservoir rock can be caused by smaller grains or matrix between larger grains, or caused by predominant silt-sized or clay-sized grains (as is the case for tight shale reservoirs). Tight hydrocarbon reservoirs can contain oil and/or natural gas as well as water-based formation fluid such as brine in the relatively impermeable reservoir rock.

As used herein, the term "petrophysical properties" means physical and chemical properties of reservoir rock and its hydrocarbon content and non-hydrocarbon content, such as water-based formation fluids. As used herein, "formation" refers to an amount of rock strata that have a comparable lithology, facies or other similar properties. As used herein, "physical parameters" refer to measurable and quantifiable physical properties of rocks or fluids. As used herein, "Helmholtz energy" refers to the thermodynamic potential of the mixture, which characterizes the potential energy of this mixture under specified temperature, volume and amounts of different types of molecules.

As used herein, a "completion plan" refers to the events and equipment necessary to bring a wellbore into production once drilling operations have been concluded, including, but not limited to, the assembly of downhole tubulars and equipment required to enable safe and efficient production from an oil or gas well.

As used herein, a "development plan" refers to the events and equipment necessary to produce hydrocarbons from oil/gas bearing formation, including, but not limited to, drilling wells with specified trajectories, performing hydraulic fracturing operations and other operations like injection of EOR/IOR agents. A development plan comprises completion plans for individual wells.

Economic production from tight shale reservoirs (organic shale) is governed by the ability to position horizontal wells in a quality reservoir that can be effectively stimulated with hydraulic fracturing, using the log and core data acquired from vertical wells. The major factors that drive successful production from these wells include petrophysical properties, such as porosity, permeability, wettability, hydrocarbon saturation, and pore pressure. Other factors include geomechanical attributes such as hydraulic fracture surface area plus fracture conductivity. In addition to accurately measuring all the physical and petrophysical properties of the reservoirs, it is of equal importance to have accurate simulations based on known rock samples from the tight reservoirs. With accurate and realistic simulations, a development plan can be created to increase the recovery efficiency.

Multi-phase flow analysis improves the accuracy of simulations by taking into consideration most if not all the relevant factors that are measurable about the tight hydrocarbon reservoir, including intrinsic properties, background properties, combined properties and the properties of the artificially introduced agents. For example, the intrinsic physical and petrophysical properties of the reservoirs, while also taking into consideration background properties such as the temperature distribution or pressure distributions. Other related factors include wettability distribution and absolute permeability distribution, as well as several artificially introduced factors such as secondary water, or surfactant agents used in the EOR operation.

In addition to multi-phase flow analysis, digital rock modeling is performed for the tight hydrocarbon reservoir to evaluate the total amount of fluid in the reservoir. The digital rock modeling involves the combination of digital rock technology and density functional description of multiphase multicomponent mixtures. In the modeling, nanoscale digital rock models are used to compute the actual distribution of hydrocarbons in rock, which is then used to calculate the overall amount of the hydrocarbon reserves by taking into consideration the overall reservoir volume, the calculated amounts of hydrocarbon (oil or gas) for 3D models, and the relative frequency in the reservoir.

Example 1: Digital Rock Modeling

The evaluation of fluid hydrocarbon reserves for particular geological formations is a necessary step in the field development planning and production forecast. For conventional fluid hydrocarbon reservoirs the evaluation procedure contains the following steps: 1) evaluating reservoir fluid properties (e.g. density, composition) using, but not limited to, downhole fluid probes or recombined surface fluid probes; 2) evaluating pore volume in the reservoir using respective well logging data or any other applicable data, methods and/or tools; 3) evaluating fractions of pore volume saturated by different fluid phases (e.g., gas, oil, water, if there is a multiphase mixture) using respective well logging data or any other applicable data, methods and/or tools; and 4) computing the total amount of fluid in the reservoir (gas, oil, water, and specific hydrocarbon components) using information obtained from previous steps.

This conventional procedure is based on the assumption that fluid properties are the same in all parts of the hydrodynamically connected reservoir. This assumption is in correspondence with the concept of the initial thermodynamic equilibrium of the fluid in the reservoir.

It is well known, that for the tight heterogeneous formations (like shales) with pores in the nanometer range there are different phenomena, which can affect the fluid state and composition: adsorption/absorption, osmosis, capillary condensation, disjoining pressure, and dispersion forces. Because of this the conventional procedure for the evaluation of reserves is not directly applicable.

Embodiments of the present disclosure provide a new method for the evaluation of reserves which combines digital rock technology and density functional description of multiphase multicomponent mixtures. The method of the present disclosure makes use of nanoscale digital rock models to compute the actual distribution of hydrocarbons in the rock and then provides the calculation of the overall amount of reserves by the summation procedure that in one of the realizations uses an overall reservoir (or studied piece) volume, calculated amounts for 3D models, and their relative frequency in the reservoir or in the studied piece.

Conventionally, the procedure to evaluate the amount of gas $A_{gas}$ and oil $A_{oil}$ in place for conventional reservoirs is based on the integral equations $$A_{gas} = \int \phi \rho_{gas} s_{gas} dV \quad (1)$$

$$A_{oil} = \int \phi \rho_{oil} s_{oil} dV \quad (2)$$

where the integration is carried out for the whole reservoir or particular deposit, $\phi$ is porosity distribution, $\rho_{gas}$, $\rho_{oil}$ are gas and oil densities under reservoir conditions, and $s_{gas}$, $s_{oil}$ are gas and oil saturation distributions. The quantities $\rho_{gas}$, $\rho_{oil}$ are obtained from downhole fluid probes or recombined surface fluid probes, while the 3D fields of quantities $\phi$, $s_{gas}$, $s_{oil}$ are obtained in the process of 3D geological modeling (essentially from relevant well logging data). When the amount of specific hydrocarbon components is required, the equations (1), (2) are modified in the following way $$A_{igas} = \int \phi c_{igas} \rho_{gas} s_{gas} dV \quad (3)$$

$$A_{ioil} = \int \phi c_{ioil} \rho_{oil} s_{oil} dV \quad (4)$$

where $c_{igas}$, $c_{ioil}$ are gas and oil mass concentrations of the component with number i. These concentrations are also evaluated using downhole or recombined surface fluid probes.

Equations (1)-(4) provide the estimates for overall mass of oil and gas in the reservoir as well as mass of separate hydrocarbon components. These parameters are used to calculate respective volume and mass of gas and oil at surface conditions.

Equations (1)-(4) cease to work for tight heterogeneous reservoirs where fluid properties can vary in narrow pores and there can be significant amount of hydrocarbons in adsorbed/absorbed form. In these cases the procedure for the evaluation of reserves must be corrected with account of relevant physical and chemical nanoscale phenomena.

It is therefore proposed a new procedure for the evaluation of hydrocarbon reserves, which is based on the following steps:

First, construct the thermodynamic description of the reservoir fluid using relevant analytical equations of state by analyzing downhole fluid probes or/and recombined surface fluid probes or any other fluid data, including, but not limited to, the fluid inclusion analysis on trapped fluid in closed down pores and any other related experimental or analytical methods taken or analyzed at the initial state of the reservoir assessment (prior to the production) or derived from the non-initial state in a form of approximation, for example, the Peng-Robinson equation of state. Where the initial state of the fluid is characterized by the early state fluid probes and is interpreted as the fluid state in the reservoir inside large pores or fractures, as the most mobile part of the reservoir fluid. In particular, the analytical form of the Helmholtz energy of the fluid per unit volume is derived $$f = f(T, n_i) \quad (5)$$

where T is reservoir absolute temperature and $n_i$ are molar densities of chemical components (amounts of certain types of molecules per unit volume) in the reservoir mixture (subscript i is an ordinal number of a particular component). Using equation (5) for the Helmholtz energy per unit volume, one can calculate the analytical expressions for the chemical potentials $$\kappa_i = \frac{\partial f}{\partial n_i} \quad (6)$$

and numerical values of chemical potentials at the initial state of the fluid $\kappa_{i0}$.

Second, the geological heterogeneity of the reservoir or its portion is studied using well logging data and core samples, with identification of representative core samples. These representative core samples are used to provide 3D images of the rocks by, but not limited to, X-ray micro tomography, 3D NMR imaging, 3D reconstruction from petrographic thin-section analysis and confocal microscopy, 3D reconstruction from analysis of 2D element maps acquired by Scanning-Electron Microscopy (SEM), 3D Focused Ion Beam Scanning-Electron Microscopy (FIB-SEM) with possible addition of Energy-dispersive X-ray spectroscopy (EDX) function etc.; digital processing and morphological analysis of the 3D core images by consecutive application of image filtering, segmentation and multiple property recognition. The digital 3D model is therefore generated by the simulation scheme discussed above. As a result of this step, different digital 3D models of porous rock samples are obtained with detailed distribution of pores and mineralogical content.

Third, using the bulk Helmholtz energy of the fluid (5), 3D digital rock models and interaction potentials between constituent minerals and components of the fluid mixture the overall Helmholtz energy functional of the fluid in rock is constructed in analytical form $$F = F[T, n_i] \quad (7)$$

Here T is absolute temperature, $n_i$ are molar densities of fluid chemical components. In particular, this explicit expression is used to derive analytical expression for chemical potentials of the constituent components $$\kappa_i = \frac{\delta F}{\delta n_i}.$$

Fourth, the 3D distribution of chemical components in the rock is found numerically as absolute conditional minimum of the density functional (7) with restrictions $$\kappa_i = \kappa_{i0} \quad (8)$$

which is a necessary and sufficient condition for the distribution of the fluid chemical components in the rock to be in stable thermodynamic equilibrium and being consistent with initial state of the fluid in the bulk.

This distribution corresponds to the stable thermodynamic equilibrium of fluid inside the rock sample, which is consistent with the fluid probes studied in the first step that is representing the mobile fluid. This also makes the evaluation of average molar densities for digital rock models possible:

$$\bar{n}_i(k) = \frac{1}{V(k)} \int_{M(k)} n_i dV \quad (9)$$

where the integration is carried out over 3D model M(k) with overall volume V(k). If within the 3D fluid distribution, voxels (elementary cells) can be attributed to gas or oil specifically, one can average the densities for these phases $$\bar{n}_{i\,gas}(k) = \frac{1}{V(k)} \int_{M(k)} n_{i\,gas} dV \quad (10)$$

$$\bar{n}_{i\,oil}(k) = \frac{1}{V(k)} \int_{M(k)} n_{i\,oil} dV \quad (11)$$

Fifth, the overall amount of the component i (in moles) in the reservoir (or part of the reservoir) is found as the following sums with subdivision into phases (if applicable)

$$B_i = V \sum_k \alpha_k \bar{n}_i(k) \quad (12)$$

$$B_{i\,gas} = V \sum_k \alpha_k \bar{n}_{i\,gas}(k) \quad (13)$$

$$B_{i\,oil} = V \sum_k \alpha_k \bar{n}_{i\,oil}(k) \quad (14)$$

where V is the volume of the reservoir (or part of the reservoir), $\alpha_k$ is frequency or probability of the particular 3D model M(k) in the reservoir.

One can convert it into mass units applying multiplication by molar mass of the component $m_i$ $$A_i = m_i B_i \quad (15)$$

$$A_{i\,gas} = m_i B_{i\,gas} \quad (16)$$

$$A_{i\,oil} = m_i B_{i\,oil} \quad (17)$$

These last results provide the corrected values of hydrocarbon reserves instead of quantities (1), (2).

To demonstrate application of the present invention, geological reserves in a tight rock formation were evaluated using the methodology contained in Eq. (5)-(17). To evaluate geological heterogeneity of the formation, several representative core samples were studied. From these core samples a set of representative rock blocks were used for modeling thermodynamically equilibrium distribution of fluids on the pore scale corresponding to the Eq. (5)-(8). Then, reserves were calculated over the entire rock blocks using the Eq. (9)-(10). Finally, the geological reserves were evaluated using the Eq. (11)-(17) and utilizing the information about actual prevalence of each of the studied rock blocks within the core samples.

Modeling within separate rock blocks were carried out using 3D pore-scale numerical simulations that take into account multiphase compositional phenomena with account of nanoscale physical phenomena and non-classical thermodynamic effects (small system thermodynamics). Namely, the numerical simulations were performed using the Density Functional Hydrodynamics (DFH) effectively resulting in achieving the required minimum of the functional in Eq. (7) together with fulfillment of the conditions in Eq. (8).

Scanning techniques rendering sufficiently high resolution (e.g., FIB-SEM scanning) were used to obtain spatial distribution of rock grains, pores and solid organics within a representative rock block within a representative core sample of the tight rock formation as shown in example image in FIG. 1. At the same time, using a lower resolution scanning technique (e.g., X-ray micro tomography), information about heterogeneity features at the larger scale (i.e., core scale) was obtained as shown in example image in FIG. 2. Robustness of analysis is attained by collecting and studying a sufficient number of the representative rock blocks (similar to shown in FIG. 1) and a sufficient number of the representative cores (samples similar to shown in FIG. 2).

Figure 3:
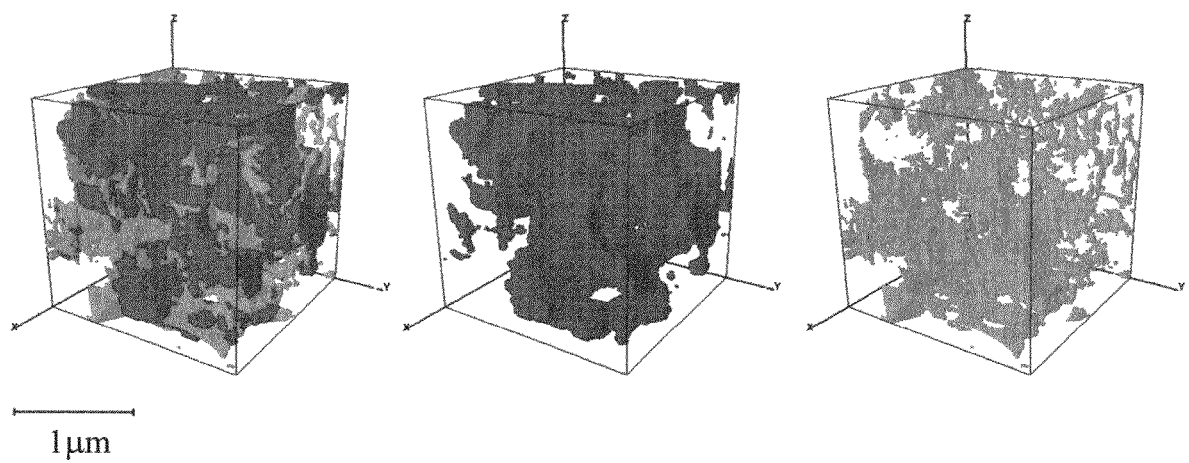
FIG. 3 shows high resolution 3D digital model distribution of: both pores and solid organics in left image; pores alone in middle image; and solid organics alone in the right image. Rock grains are made transparent in all three images above.
Figure 4:
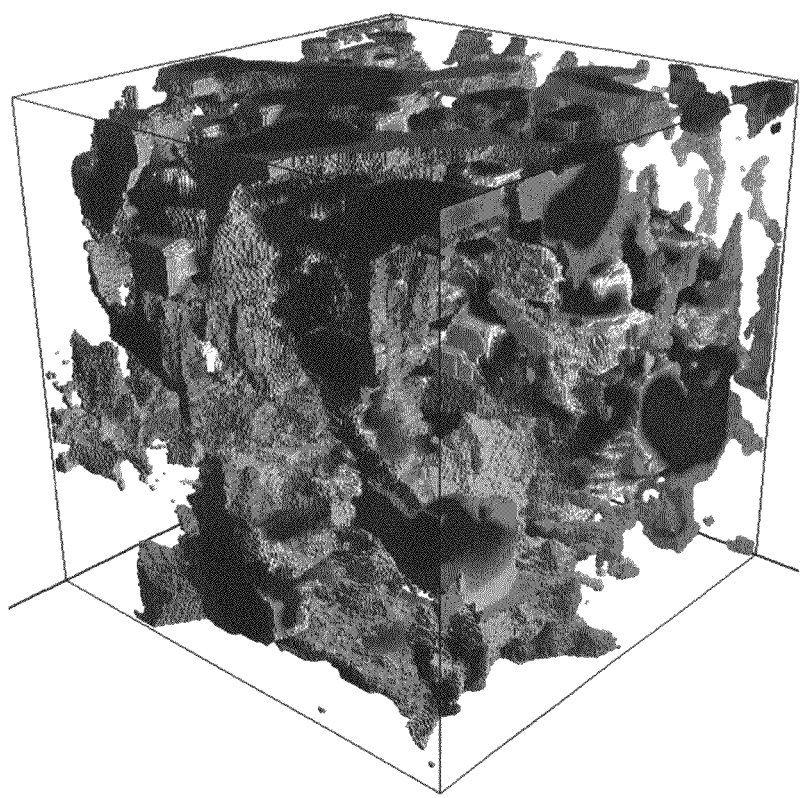
FIG. 4 shows 3D distribution of hydrocarbon components (HC) in liquid, HC in gas, and HC in solid organics within 3D high resolution digital model.

Using a set of high resolution two-dimensional images (similar to shown in FIG. 1) a high resolution 3D digital model was constructed (as in example shown in FIG. 3). Using this 3D high resolution digital model, its storage capacity was evaluated by finding conditional minimum of the Helmholtz energy functional Eq. (7) together with fulfillment of the conditions in Eq. (8). In order to do this a full system of the DFH hydrodynamic equations was solved numerically until reaching an equilibrium solution. During the simulation the relevant phenomena such as flow at wide Knudsen number range, diffusive and convective transport, disjoining pressure, direct and reverse osmosis effects, capillary condensation, thin film precursors and anomalous rheology, contact angle hysteresis due to both roughness and capillary number, adsorption, storage and desorption of solid organic components were taken into account. An example of the thermodynamic equilibrium distribution of components obtained in this way is shown in FIG. 4.

Figure 2:
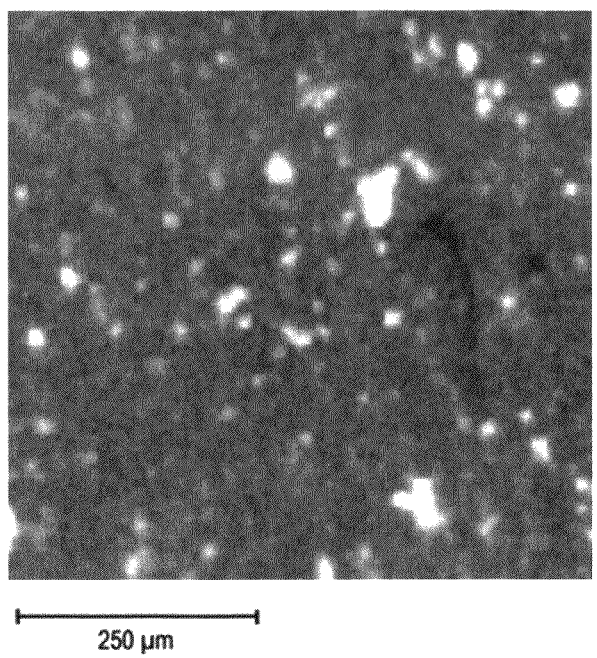
FIG. 2 shows the lower resolution and bigger scale image showing the heterogeneity features such as clusters with predominance of solid grains, clusters with predominance of pores, clusters with predominance of solid organics, and micro fractures.
Figure 5:
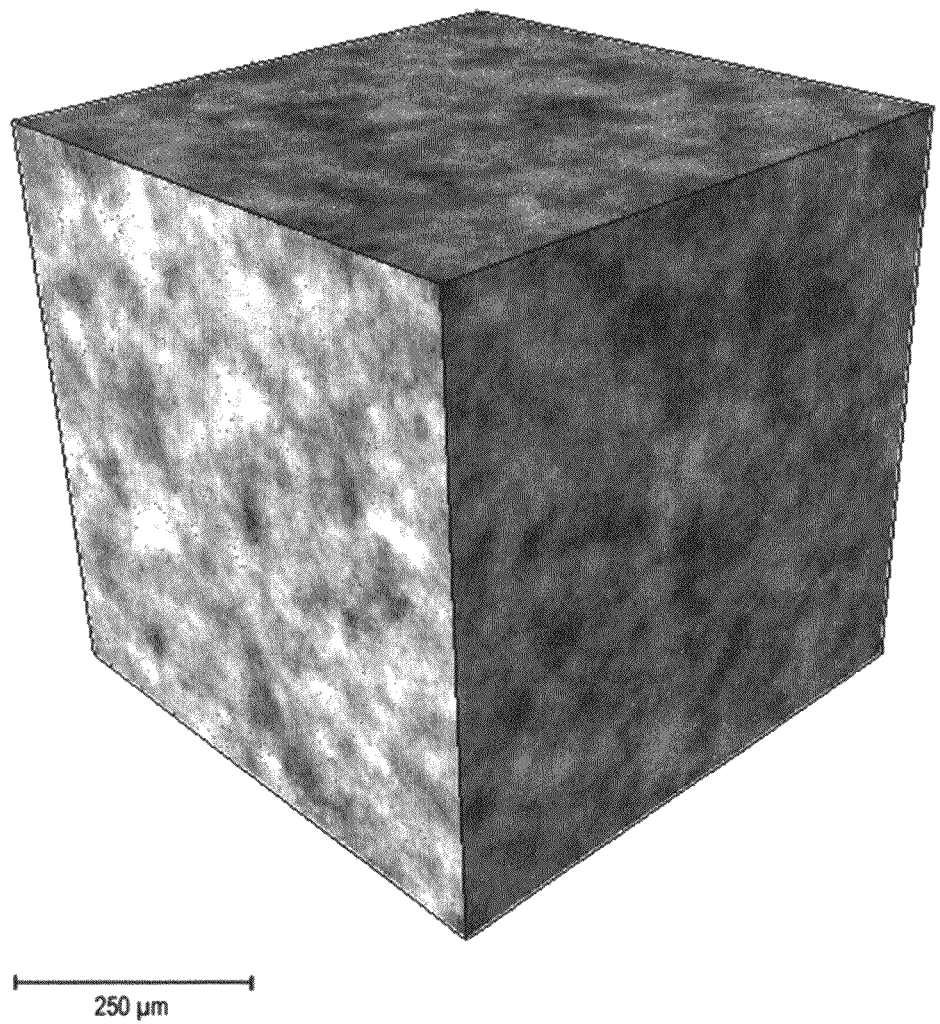
FIG. 5 shows distribution of heterogeneity features such as clusters with predominance of solid grains, clusters with predominance of pores filled with liquid, clusters with predominance of pores filled with gas, clusters with predominance of solid organics, and micro fractures within higher scale 3D digital model.
Figure 6:
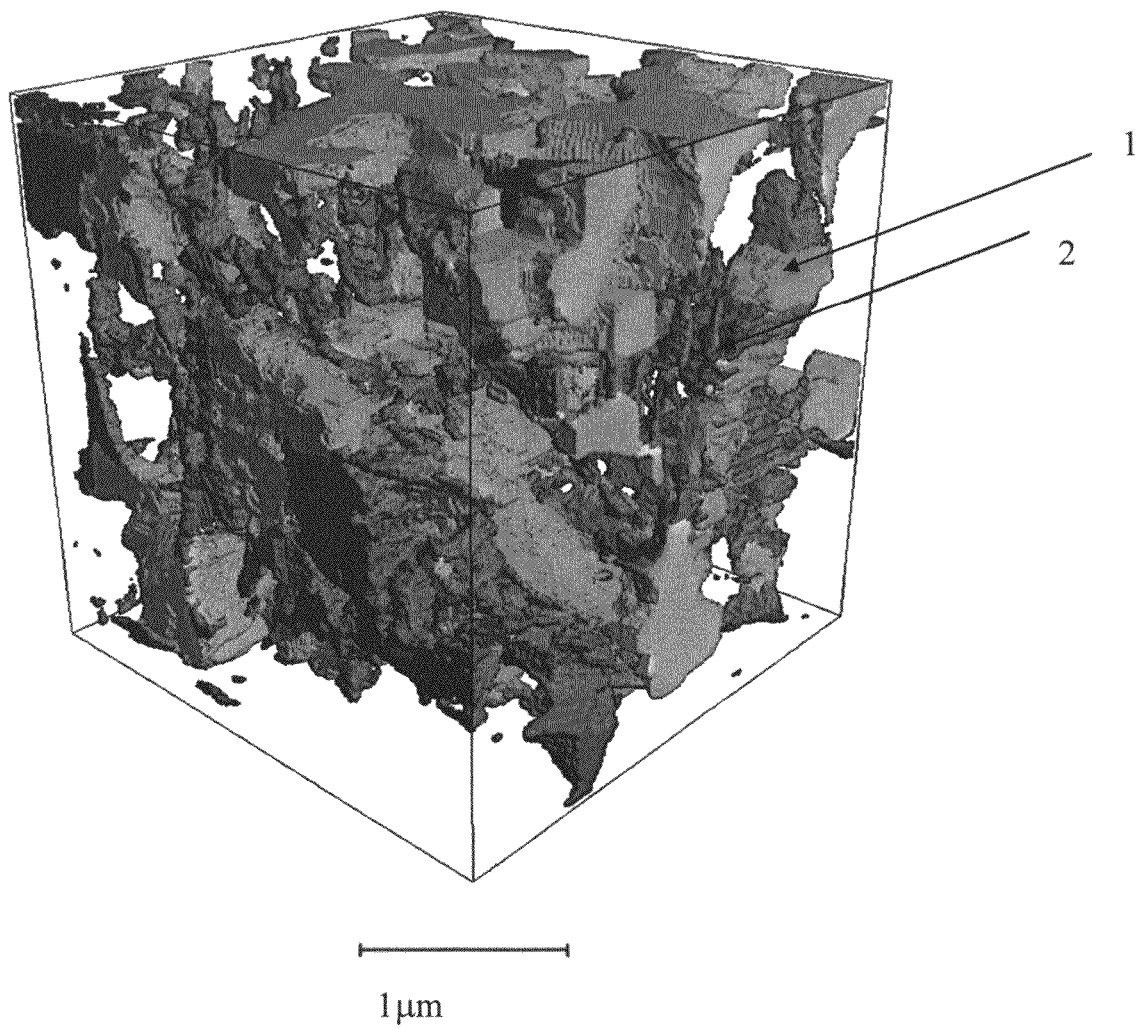
FIG. 6 shows an example of 3D distribution of hydrocarbon components (HC) in high resolution 3D digital model in the initial equilibrium state; different shading indicates HC in liquid (1), HC in solid organics (2), and other shading indicates the composition gradients.
Figure 7:
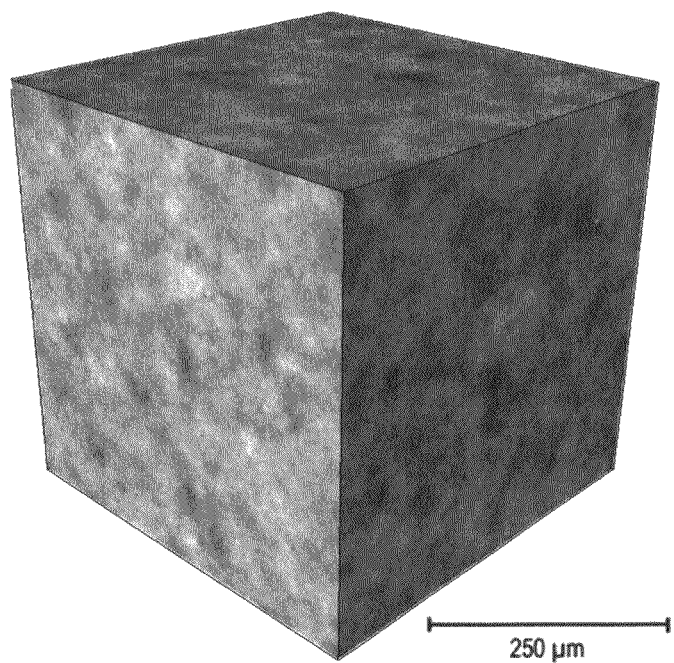
FIG. 7 shows an example of distribution of heterogeneity features in higher scale 3D digital model in the initial equilibrium state. The heterogeneity features are clusters with predominance of solid grains, clusters with predominance of pores filled with liquid, clusters with predominance of solid organics, and micro fractures.

The obtained information about distribution of hydrocarbon components on a representative set of high resolution digital models, together with the information obtained in the 2D lower resolution scans such as shown in FIG. 2, were used to construct a set of the higher scale 3D models of the representative core samples containing the distribution of the heterogeneity features such as clusters with predominance of solid grains, clusters with predominance of pores filled with liquid, clusters with predominance of pores filled with gas, clusters with predominance of solid organics (FIG. 5).

Example 3: EOR/IOR Scheme Development

One important part in hydrocarbon field development planning is evaluation and optimization of different enhanced or improved oil recovery schemes. At present this problem is solved by two complementary methods: (a) using detailed geological and hydrodynamic reservoir 3D modeling with application of commercial simulators to obtain quantitative description of reservoir processes, and (b) with physical core flood tests in a laboratory environment. Once a sufficient number of the various development scenarios are obtained by ideally a combination of simulations and physical tests, an ideal case is identified as the optimal development solution.

There are, however, several shortcomings of this approach.

First, there are many enhanced oil recovery (EOR) and improved oil recovery (IOR) techniques which utilize complex physical and chemical processes at pore scale. Within the existing scope of commercial reservoir simulators the modeling is based on macroscopic Darcy flow concept, which is inadequate for complex microscale and nanoscale phenomena. In order to overcome this difficulty, ever more sophisticated transport models for porous rocks are being developed; and every such new model relies on additional phenomenological parameters, which are to be fixed by experimental data. Yet in EOR and IOR techniques the experimental support of simulation models is restricted by the fact that every experimental run irrevocably changes the experimental rock sample. This makes the validation of the macroscopic modeling problematic.

Second, the practical effectiveness of EOR and IOR techniques is dependent on small-scale geological structure of the formation. In the case of a high degree of pore-scale heterogeneity, the reservoir simulations based on large-scale averaging of geological parameters are no longer applicable.

The present disclosure provides a computational approach for the quantitative evaluation and optimization of EOR/IOR development schemes in case of tight heterogeneous formations. The computational approach combines a digital rock approach with density functional modeling of processes at pore scale.

It is well known that for the tight heterogeneous formations (like shale) with pores in a nanometer range there can be different phenomena which affect the fluid state and composition (e.g., adsorption/absorption, osmosis, capillary condensation, disjoining pressure, and dispersion forces). All of these phenomena are addressed by multiphase compositional hydrodynamics utilizing density functional method. This approach produces direct quantitative description of complex physical and chemical processes at pore scale without reliance on macroscopic phenomenological parameters.

This disclosure describes the EOR/IOR processes using a combination of micro/nano-scale density functional modeling for representative rock samples and macro-scale fluid transport modeling in statistical ensemble of these rock samples.

At present the reservoir simulators rely on fluid transport model for oil and gas in rocks, which is called the Darcy law:

$$u_a = -\mu^{-1} \sum_{b=1}^{3} k_{ab}(\partial_b p + \rho \partial_b \varphi) \tag{18}$$

where $u_a$ is the fluid transport velocity, $\mu$ is the shear viscosity, $k_{ab}$ is the symmetric permeability tensor, $\rho$ is the fluid mass density, $\varphi$ is the gravitational potential, and $\partial_b$ is the partial derivative in respect to a Cartesian coordinate.

The expression (18) is used for one-phase flow, while in multiphase transport it is assumed that there are separate phase transport velocities, every one of them being described by separate law with the same functional structure in equation (18).

When the transport of individual chemical components (like water or methane) of the reservoir fluid is considered, the convective transport with carrier velocity (18) is combined with diffusive or dispersive transport. The resulting concentration flux is represented as follows [E. J. Peters, Petrophysics. University of Texas, 2007, pp. 5-23, 5-24]

$$q_{ia} = c_i u_a - \sum_{b=1}^{3} d_{ab} \partial_b c_i \tag{19}$$

where $q_{ia}$ is the concentration flux of the i-th chemical component, $c_i$ is the concentration of this component, and $d_{ab}$ is the diffusion or dispersion matrix.

The transport laws (18), (19) do not cover all transport phenomena, which are observed in real tight geological formations and real EOR/IOR processes. Indeed, for tight rocks there can be osmotic effects, like growth of pressure gradient (i.e., direct osmosis, which contradicts (18)) or growth of concentration gradient (i.e., reverse osmosis, which contradicts (19)). Additional phenomena not considered in the transport laws are electro-kinetic transport, absorption, and diffusive transport of hydrocarbons in organic phase of the rock matrix.

At present the multitude of EOR/IOR phenomena at pore-scale is clearly recognized, but these phenomena are studied and modeled separately in the frame of specific models. This leads to the multitude of different models, which are quite adequate by themselves, but are mutually contradictory when considered in combination [Othman, M. B., Jalan, S., Masoudi, R., & Mohd Shaharudin, M. S. B. (2013 Jul. 2). Chemical EOR: Challenges for Full Field Simulation. Society of Petroleum Engineers. doi: 10.2118/165247-MS].

This situation presents conceptual difficulties in case of highly heterogeneous reservoirs, when there is a need to describe EOR/IOR in some large block of the formation, while sharply different parts of this block exhibit different physical and chemical effects.

Embodiments of the present disclosure remove this conceptual difficulty by describing the EOR/IOR processes for representative rock samples directly using density functional modeling, while consequent fluid exchange between different rock samples is described using a set of transfer matrices.

A new procedure for the quantitative evaluation and optimization of EOR/IOR techniques for tight heterogeneous reservoirs is therefore proposed, which is based on the following steps.

First, the geological heterogeneity of the reservoir is studied using well logging and core samples, with identification of representative core samples. These representative core samples are used to provide 3D porous solid images by, but not limited to, X-ray micro tomography, 3D NMR imaging, 3D reconstruction from petrographic thin-section analysis and confocal microscopy, 3D reconstruction from analysis of 2D element maps acquired by Scanning-Electron Microscopy (SEM), 3D focused ion beam Scanning-Electron Microscopy (FIB-SEM) with possible addition of Energy-dispersive X-ray spectroscopy (EDX) function etc.; digital processing and morphological analysis of the 3D core images by consecutive application of image filtering, segmentation and multiple property recognition. As a result of this step a set of digital 3D models of porous rock samples is constructed with each model having detailed distribution of pores and mineralogical content. In one of the embodiments this set of digital rock models is interpreted as statistical ensemble, where each model is associated with its individual weight $w_A$ in respect to the considered reservoir or part of the reservoir. If $V_A$ is the volume of a particular model, and $V_{res}$ is the volume of the reservoir then the weights are normalized as follows $$V_{res} = \Sigma w_A V_A \quad (20)$$

Second, using thermodynamic properties of the reservoir fluid and injection agents, 3D digital rock models, and interaction potentials between constituent minerals and components of the fluid mixture, the overall Helmholtz energy functional of the fluid in rock is constructed in analytical form $$F = F[T, n_i] \quad (21)$$

Here T is absolute temperature, $n_i$ are molar densities of fluid chemical components. In particular, the explicit expression (21) is used to derive the analytical expression for chemical potentials of the constituent components $$\kappa_i = \frac{\delta F}{\delta n_i}.$$

Third, the 3D distribution of fluid chemical components in the rock is found numerically as absolute conditional minimum of the density functional with restrictions on overall amount of every component in 3D model $$N_i = \int n_i dV \quad (22)$$

where $N_i$ is the total amount of i-th fluid chemical component calculated in moles.

The proposed approximation of quasi-equilibrium fluid distribution is valid when the changes in overall amount of components (22) are relatively slow. This is usually true for the reservoir EOR/IOR processes according to Lake, L. W., Enhanced Oil Recovery, Prentice Hall, 1989. After doing the said minimization, one is able to compute numerical values of chemical potentials, which are constant over the entire 3D model $$\kappa_i = const \quad (23)$$

Fourth, the fluid component exchange rate between representative pieces of rock is characterized by component transfer matrix $T_{ij}^{AB}$ and caused by difference in chemical potentials $$I_i^{B \to A} = \sum_j T_{ij}^{AB} (\kappa_j^B - \kappa_j^A) \quad (24)$$

The transfer matrix at the interface between two pieces of rock A and B, $T_{ij}^{AB}$ can be calculated numerically using the density functional modeling. The same equation (24) is used to describe the exchange rate between rock sample A and neighboring media B outside the considered reservoir or a part of the reservoir (for example, injection well, production well, aquifer, etc.). Again in this last case the fluid exchange rate is caused by difference of chemical potentials between rock sample A and neighboring media B, and the transfer matrix $T_{ij}^{AB}$ can be calculated numerically using the density functional modeling.

Fifth, for different EOR/IOR scenarios one can evaluate the resulting dynamics of overall amount of chemical components using the exchange rate (24):

$$N_{i tot} = \sum_A w_A N_i^A \quad (25)$$

In particular, this provides the quantitative evaluation of hydrocarbon recovery, and one can choose the optimal scenario.

In one of the embodiments steps four and five can be replaced with the final step at which the primary recovery and the recovery of various EOR scenarios are evaluated by calculating the dynamics of overall recovered chemical components per each considered 3D rock model and the optimal scenario selection is being performed.

To demonstrate application of the present invention, an EOR scenario in a tight rock formation was selected using the methodology contained in Eq. (20)-(25). To evaluate geological heterogeneity of the formation, several representative core samples were studied. From these core samples, a set of representative rock blocks was extracted and was interpreted as a statistical ensemble, especially according to the Multi-Phase Flow analysis above. Both representative rock blocks and representative core samples were used for simulation of fluid distribution corresponding to different EOR scenarios. The simulations were carried out using the Density Functional Hydrodynamics (DFH). The overall additional production of chemical components attributable to the EOR scenarios was evaluated using initial amounts of components in accordance with Eq. (8), and the optimal EOR scenario rendering maximum additional production in terms of the valuable components was selected.

Using a set of high resolution, two-dimensional images similar to those shown in FIG. 1, a statistical ensemble of high resolution 3D digital models was constructed; an example of one model from the ensemble is shown in FIG. 3. Initial equilibrium distributions of chemical components, described by Eq. (22) and (23), were simulated within the pores of the models using the DFH (FIG. 4). The description of properties of the chemical components used in the DFH simulations was based on the Helmholtz energy functional in Eq. (21). Also, using a set of the lower resolution images similar to that shown in FIG. 2 together with the information about distribution of chemical components obtained (i.e., similar to shown in FIG. 4) in the statistical ensemble of the high resolution models, a statistical ensemble of higher scale 3D digital models containing heterogeneity features was constructed; an example of one model is shown in FIG. 5.

Figure 8A:
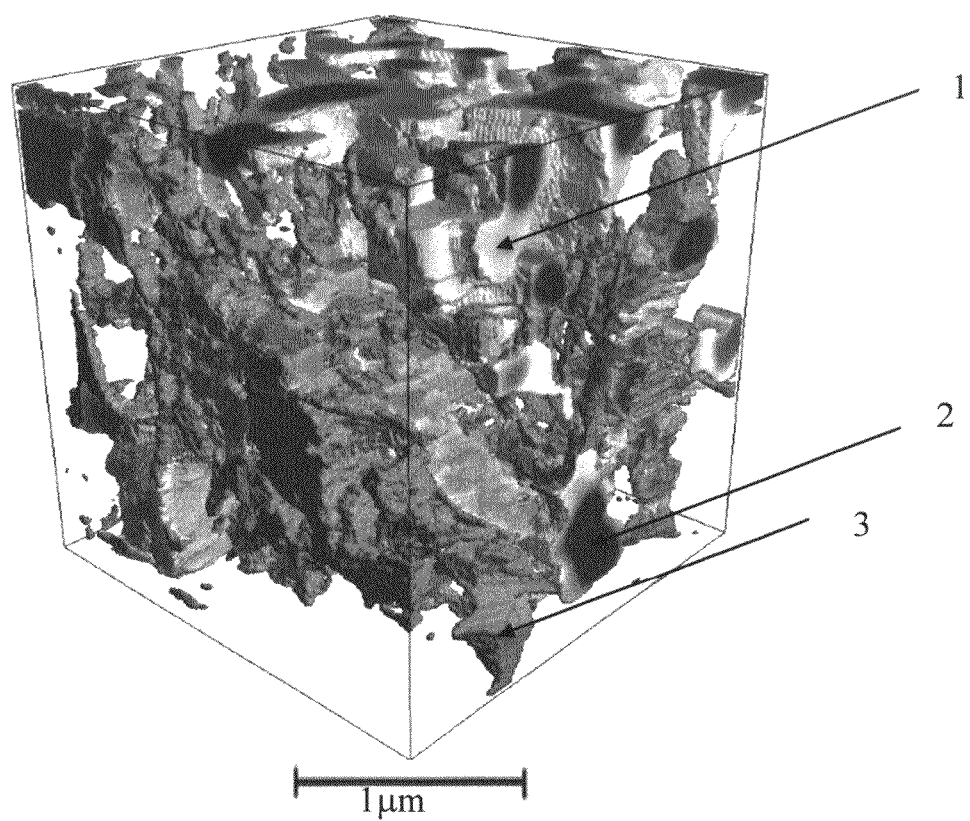
FIG. 8A-B shows an example of 3D distribution of hydrocarbon components (HC) in high resolution 3D digital model after depletion on the gas drive (FIG. 8A) and after additional depletion using a typical EOR agent (surfactant) (FIG. 8B); different shading indicates HC in liquid (1), HC in gas (2), HC in solid organics (3), surfactant EOR agent (4), and other shades indicate the composition gradients.

As the next step, the primary recovery, with account for the gas drive mechanism, was simulated numerically using both the statistical ensemble of the high resolution models and the statistical ensemble of the higher scale models. Modeling within separate 3D high resolution models was carried out using 3D pore-scale numerical simulations that take into account multiphase compositional phenomena with account of nanoscale physical phenomena and non-classical thermodynamic effects (small system nonequilibrium thermodynamics). Namely, the numerical simulations were performed using the DFH taking into account the relevant phenomena such as flow at wide Knudsen number range, diffusive and advective transport, disjoining pressure, direct and reverse osmosis effects, capillary condensation, thin film precursors and anomalous rheology, contact angle hysteresis due to both roughness and capillary number, adsorption, storage and desorption of solid organic components. The results of the numerical simulations obtained in this way were such that they minimized Helmholtz energy functional in Eq. (21) and fulfilled the necessary conditions in Eq. (22) and (23) (FIG. 8A).

Figure 9A:
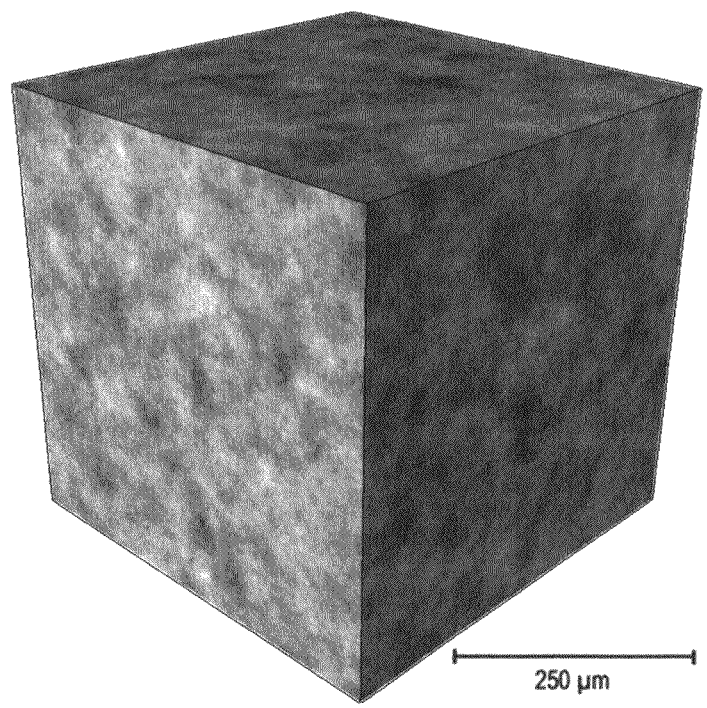
FIG. 9A-B shows an example of distribution of heterogeneity features in higher scale 3D digital model after the primary recovery (a) and after the EOR process with surfactant treatment (b). The heterogeneity features are clusters with predominance of solid grains, clusters with predominance of pores filled with liquid, clusters with predominance of pores filled with gas, clusters with predominance of solid organics, cluster with predominance of EOR agent, and micro-fractures.

From the results of the numerical simulations on the statistical ensemble of the 3D high resolution digital models the transfer matrices TAB were extracted. These matrices were used in numerical simulations of the primary recovery on the statistical ensemble of the higher scale models. The numerical simulations on the higher scale models were carried out by solving numerically Eq. (24) (FIG. 9A).

Figure 8B:
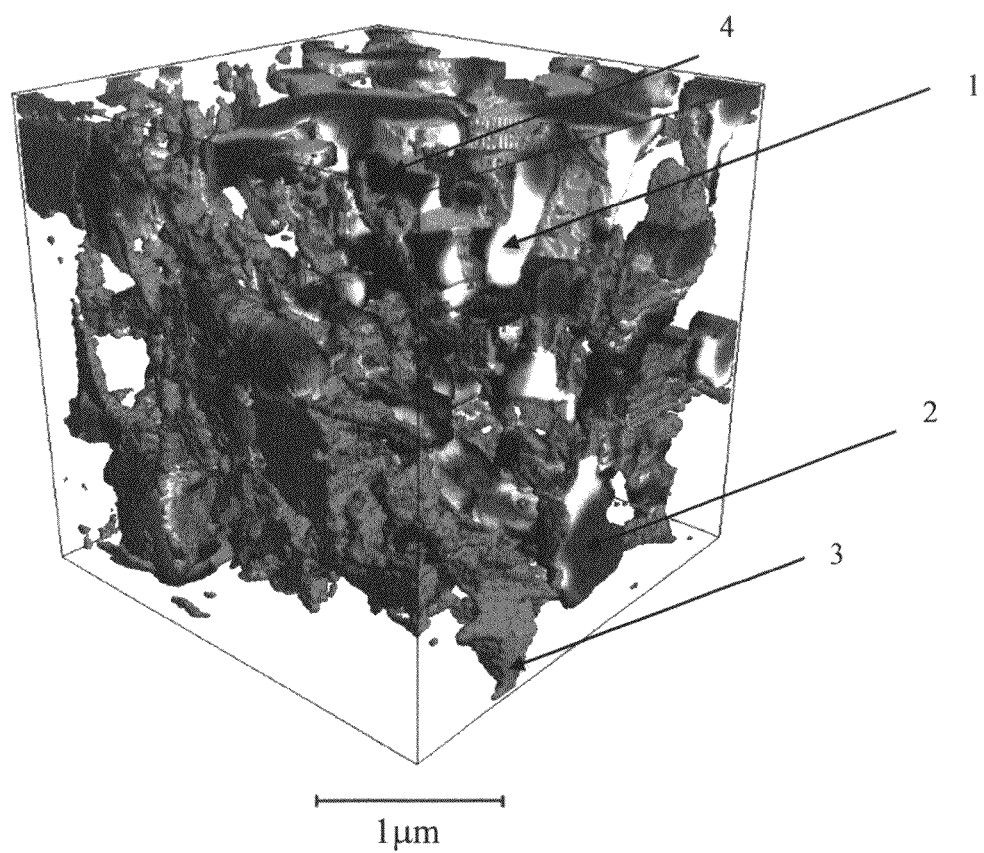
Figure 9B:
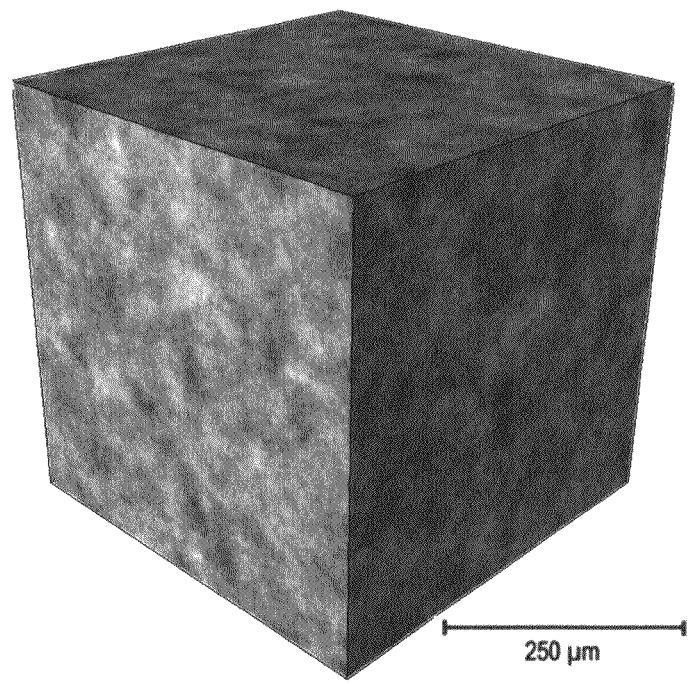

After simulating the primary recovery process, a set of EOR scenarios was simulated (FIGS. 8B and 9B) using the same methodology that was used in simulation of the primary recovery. The difference between separate EOR scenarios was in type, quantity, and the way of application of an EOR agent as well as in physical mechanism by which this agent interacted with fluids and rock. The description of the EOR agent was based on the Helmholtz energy functional in Eq. (21).

Figure 10:
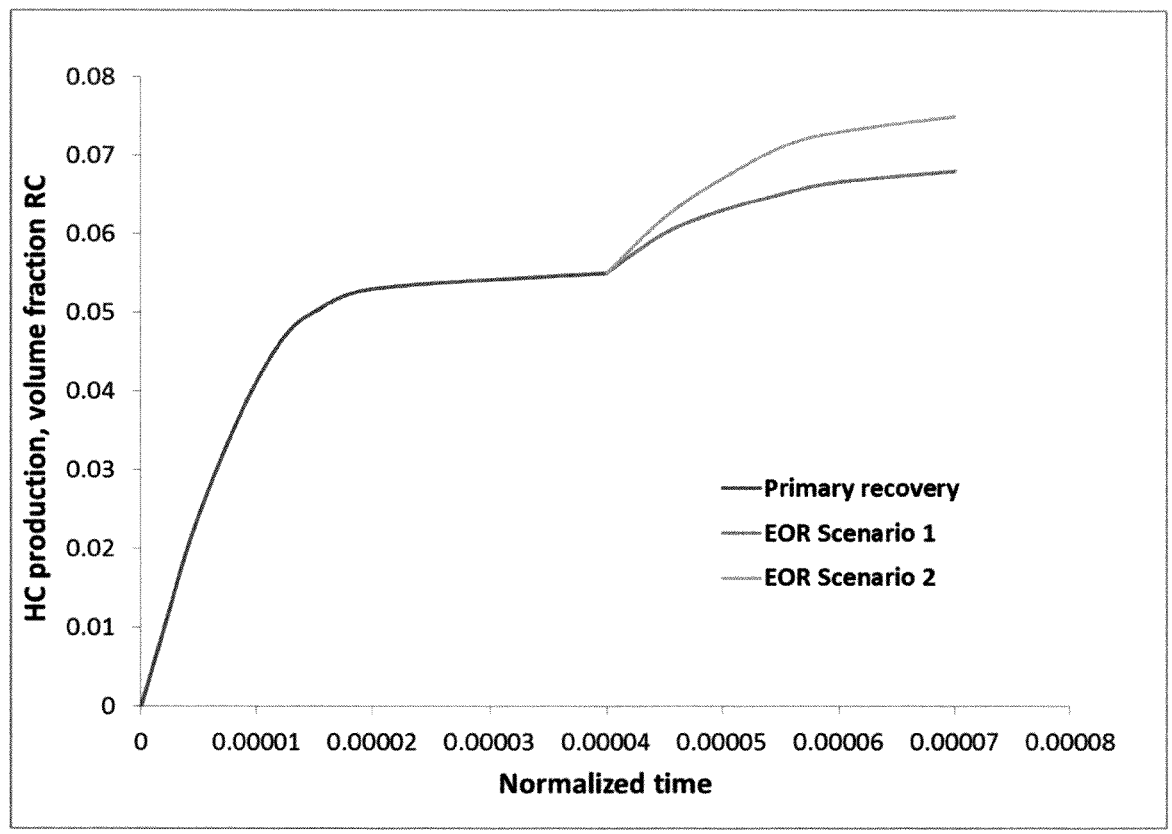
FIG. 10 shows an example of comparison of primary recovery and two scenarios with alternative EOR (two different surfactants).

As the final step, primary recovery and separate EOR scenarios were evaluated by calculating the dynamics of overall recovered chemical components using Eq. (25) (FIG. 10). Based on this information the optimal EOR scenario was selected. Optimal primary and EOR operations can then be carried out based on the selected scenario.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

The invention claimed is:

1. A method for an evaluation of fluids in a tight hydrocarbon reservoir within a heterogeneous geological formation or a portion thereof, the method comprising:
    receiving, via a computing system, a first three-dimensional (3D) image acquired using scanning imaging technology comprising a 3D Nuclear Magnetic Resistance (NMR) imaging, X-Ray micro tomography, Scanning-Electron Microscopy (SEM), 3D Focused Ion Beam Scanning-Electron Microscopy (FIB-SEM), or any combination thereof, wherein the scanning imaging technology generates the first 3D image at a first resolution based on one or more scans of a core sample representative of the tight hydrocarbon reservoir, wherein the first 3D image comprises one or more heterogeneity features of the core sample, and wherein the core sample is extracted from a subsurface region comprising the tight hydrocarbon reservoir;
    receiving, via the computing system, a second 3D image acquired using the scanning imaging technology, wherein the scanning imaging technology generates the second 3D image at a second resolution higher than the first resolution based on one or more additional scans of the core sample, wherein the second resolution corresponds to a nanometer scale for viewing a spatial distribution of a pore structure and a mineralogical content of the core sample;
    digitally processing, via the computing system, the first 3D image and the second 3D image via image filtering, segmentation, and multiple property recognition to generate a first digitally processed image and a second digitally processed image;
    constructing a 3D model of the tight hydrocarbon reservoir using the first digitally processed image and the second digitally processed image, wherein the 3D model comprises one or more 3D nano-scale simulations of the pore structure and the mineralogical content;
    calculating a hydrocarbon amount of the 3D model;
    calculating an overall amount of hydrocarbon reserves in the tight hydrocarbon reservoir based on the hydrocarbon amount of the 3D model; and
    creating a development plan based on the overall amount of hydrocarbon reserves, wherein the development plan comprises deploying equipment to the subsurface region to produce hydrocarbon content from the tight hydrocarbon reservoir.

2. The method of claim 1, wherein one or more physical parameters of the fluids are obtained from fluid probes located inside the tight hydrocarbon reservoir.

3. The method of claim 1, wherein calculating the hydrocarbon amount of the 3D model comprises calculating a conditional minimization of a Helmholtz energy functional.

4. The method of claim 3, wherein the 3D model is constructed based on an analytical expression of density functional Helmholtz energy.

5. The method of claim 3, wherein the density functional Helmholtz energy in the tight hydrocarbon reservoir is represented by:

$$f=f(T,n_i),$$

wherein T is an absolute temperature of the tight hydrocarbon reservoir; $n_i$ are molar densities of a respective chemical component; and i is an ordinal number of the respective chemical component, and, therefore, a chemical potential $K_i$ is calculated from the following analytical expression:

$$K_i = \frac{\partial f}{\partial n_i}.$$

6. The method of claim 5, wherein an overall Helmholtz energy functional for the tight hydrocarbon reservoir is $F=F[T,n_i],$ wherein T is the absolute temperature of the tight hydrocarbon reservoir; $n_i$ are the molar densities of the respective chemical component, and the chemical potential $K_i$ is calculated from the following analytical expression:

$K_i = \delta F/\delta n_i.$

7. The method of claim 5, wherein average molar densities $\bar{n}_i(k)$ are first calculated by formula:

$$\bar{n}_i(k) = \frac{1}{V(k)} \int_{M(k)} n_i dV,$$

wherein the integration is carried out over a 3D model M(k) with an overall volume V(k), followed by attributing a 3D fluid distribution to gas and oil while obtaining a first average density for the gas and a second average density for the oil by formulas:

$$\bar{n}_{i\,gas}(k) = \frac{1}{V(k)} \int_{M(k)} n_{i\,gas} dV$$

$$\bar{n}_{i\,oil}(k) = \frac{1}{V(k)} \int_{M(k)} n_{i\,oil} dV.$$

8. The method of claim 7, wherein the overall amount of hydrocarbon reserves in moles $B_i$ of the respective chemical component with the ordinal number i in the tight hydrocarbon reservoir is calculated by:

$$B_i = V \sum_k \alpha_k \bar{n}_i(k)$$

$$B_{i\,gas} = V \sum_k \alpha_k \bar{n}_{i\,gas}(k)$$

$$B_{i\,oil} = V \sum_k \alpha_k \bar{n}_{i\,oil}(k),$$

where V is a volume of the tight hydrocarbon reservoir, $\alpha_k$ is a frequency or probability of the 3D model M(k) in the tight hydrocarbon reservoir.

9. The method of claim 8, wherein the overall amount of hydrocarbon reserves in the moles $B_i$ is converted into mass units by applying multiplication of molar mass of component $m_i$:

$A_i = m_i B_i$ $A_{i\,gas} = m_i B_{i\,gas}$ $A_{i\,oil} = m_i B_{i\,oil}.$

10. The method of claim 1, wherein the overall amount of hydrocarbon reserves in the tight hydrocarbon reservoir is calculated using an overall reservoir volume V(k), a calculated amount of hydrocarbon reserves in the 3D model M(k), and their relative frequency $\alpha_k$, in the tight hydrocarbon reservoir or a portion of the tight hydrocarbon reservoir.

11. The method of claim 1, wherein calculating the hydrocarbon amount of the 3D model is performed for a plurality of 3D models that aggregate to a portion of the tight hydrocarbon reservoir.

12. The method of claim 1, wherein calculating the overall amount of hydrocarbon reserves is performed for a plurality of deposits to evaluate an aggregate reserve by adding the overall amount of the hydrocarbon reserves of each of the plurality of deposits.

13. A method for an evaluation and an optimization of enhanced oil recovery or improved oil recovery techniques for tight hydrocarbon reservoirs, comprising:

receiving, via a computing system, a first three-dimensional (3D) image acquired using scanning imaging technology comprising 3D Nuclear Magnetic Resistance (NMR) imaging, X-ray micro tomography, Scanning-Electron Microscopy (SEM), 3D Focused Ion Beam Scanning-Electron Microscopy (FIB-SEM), or any combination thereof, wherein the scanning imaging technology generates the first 3D image at a first resolution based on one or more scans of a core sample representative of the tight hydrocarbon reservoir, wherein the first 3D image comprises one or more heterogeneity features of the core sample, and wherein the core sample is extracted from a subsurface region comprising the tight hydrocarbon reservoir;

receiving, via the computing system, a second 3D image acquired using the scanning imaging technology, wherein the scanning imaging technology generates the second 3D image at a second resolution higher than the first resolution based on one or more additional scans of the core sample, wherein the second resolution corresponds to a nanometer scale for viewing a spatial distribution of a pore structure and mineralogical content of the core sample;

digitally processing, via the computing system, the first 3D image and the second 3D image via image filtering, segmentation, and multiple property recognition to generate a first digitally processed image and a second digitally processed image;

constructing one or more 3D rock models of porous rock using the first digitally processed image and the second digitally processed image, wherein the one or more 3D rock models comprise one or more 3D nano-scale simulations of the pore distribution and the mineralogical content;

calculating a fluid component amount of each of the one or more 3D rock models;

calculating an overall amount of fluid components in the one or more 3D rock models;

calculating a 3D distribution of the fluid components in the one or more 3D rock models;

calculating an exchange rate of the fluid components between the one or more 3D rock models;

calculating dynamics of the overall amount of the fluid components in the tight hydrocarbon reservoir, wherein calculating the dynamics of the overall amount of the fluid components is based on the calculated exchange rate of the fluid components; and creating a development plan based on the calculated dynamics, wherein the development plan comprises deploying equipment to the subsurface region to produce hydrocarbon content from the tight hydrocarbon reservoir.

14. The method of claim 13, wherein the one or more 3D rock models is associated with a weight $w_A$ for the tight hydrocarbon reservoir, and the weight $w_A$ is normalized by:

$$V_{res} = \Sigma w_A V_A$$

wherein $V_A$ is a volume of one particular 3D rock model, and $V_{res}$ is a volume of the tight hydrocarbon reservoir.

15. The method of claim 13, wherein an overall fluid mixture is described by using an overall Helmholtz energy functional, described by formula:

$$F = F[T, n_i],$$

wherein T is an absolute temperature of the tight hydrocarbon reservoir, and $n_i$ are molar densities of the fluid components.

16. The method of claim 15, wherein a chemical potential $K_i$ of the fluid components is calculated from the following expression:

$$K_i = \delta F / \delta n_i.$$

17. The method of claim 15, wherein the overall amount of fluid components in the one or more 3D rock models is calculated by the following expression:

$$N_i = \int n_i dV$$

wherein $N_i$ is a total amount of one of the fluid components in the one or more 3D rock models.

18. The method of claim 17, wherein an exchange rate $I_i^{B \to A}$ is calculated by the following expression:

$$I_i^{B \to A} = \sum_j T_{ij}^{AB} (K_j^B - K_j^A)$$

wherein $T_{ij}^{AB}$ is a fluid component transfer matrix, and $(K_j^B - K_j^A)$ is a difference in chemical potentials.

19. The method of claim 18, wherein the overall amount of fluid components is calculated using the following expression:

$$N_{i tot} = \sum_A w_A N_i^A$$

wherein $N_{i\ tot}$ is a total amount of one of the fluid components in the tight hydrocarbon reservoir.

* * * * *